United States Patent [19]
Doane et al.

[11] Patent Number: 4,688,900
[45] Date of Patent: Aug. 25, 1987

[54] LIGHT MODULATING MATERIAL COMPRISING A LIQUID CRYSTAL DISPERSION IN A PLASTIC MATRIX

[75] Inventor: Joseph W. Doane, Kent, Ohio; Giuseppe Chidishimo, Rende Italy; Nuno A.P. Vaz, Southfield, Mich.

[73] Assignee: Kent State University, Kent, Ohio

[21] Appl. No.: 776,831

[22] Filed: Sep. 17, 1985

Related U.S. Application Data

[63] Continuation-in-part of Ser. No. 590,996, Mar. 19, 1984, abandoned.

[51] Int. Cl.⁴ .............................................. G02F 1/13
[52] U.S. Cl. .............................. 350/347 V; 350/350 R; 350/351; 350/348
[58] Field of Search ................. 350/347 V, 350 R, 351

[56] References Cited

U.S. PATENT DOCUMENTS

| | | |
|---|---|---|
| 2,123,902 | 7/1938 | Land . |
| 3,529,156 | 9/1970 | Fergason et al. . |
| 3,578,844 | 5/1971 | Churchill et al. ............... 350/351 |
| 3,585,381 | 6/1971 | Hodson et al. .................. 250/47 |
| 3,600,060 | 8/1971 | Churchill et al. ............... 350/351 |
| 3,620,889 | 11/1971 | Baltzer ........................... 161/5 |
| 3,661,142 | 5/1972 | Flam .............................. 128/2 H |
| 3,663,390 | 5/1972 | Fergason et al. ............ 204/158 HE |
| 3,697,297 | 10/1972 | Churchill et al. ............... 350/351 |
| 3,720,623 | 3/1973 | Cartmell et al. ................. 252/316 |
| 3,746,426 | 7/1973 | Masi . |
| 3,748,017 | 7/1973 | Yamamura et al. . |
| 3,766,061 | 10/1973 | Mahler et al. . |
| 3,771,855 | 11/1973 | Burns . |
| 3,772,518 | 11/1973 | Murayama et al. ............. 250/211 R |
| 3,781,085 | 12/1973 | Leibowitz . |
| 3,795,529 | 3/1974 | Cartmell et al. . |
| 3,804,618 | 4/1974 | Forest et al. ..................... 96/1 R |
| 3,816,786 | 6/1974 | Churchill et al. ................. 313/91 |
| 3,852,092 | 12/1974 | Patterson et al. ................. 117/36.7 |
| 3,864,023 | 2/1975 | Glaser et al. .................... 117/217 X |
| 3,872,050 | 3/1975 | Benton et al. ................... 260/37 N |
| 3,877,790 | 4/1975 | Robinson . |
| 3,885,982 | 5/1975 | Fergason ........................ 106/252 |
| 3,892,471 | 7/1975 | Biermann et al. ............... 313/517 X |
| 3,912,366 | 10/1975 | Sprokel . |
| 3,932,024 | 1/1976 | Yaguchi et al. . |
| 3,935,337 | 1/1976 | Taylor ............................ 427/180 |
| 3,961,843 | 6/1976 | Nakamura et al. . |
| 3,969,264 | 7/1976 | Davis . |
| 3,985,427 | 10/1976 | Masi . |
| 3,990,782 | 11/1976 | Yamasaki . |
| 3,998,210 | 12/1976 | Nosari ........................... 128/2 H |
| 4,022,706 | 5/1977 | Davis ............................. 252/299.1 |
| 4,023,890 | 5/1977 | Shirasu et al. . |

(List continued on next page.)

FOREIGN PATENT DOCUMENTS

| | | | |
|---|---|---|---|
| 2139537 | 1/1973 | France ...................... | 350/331 R |
| 51-30998 | 9/1976 | Japan . | |
| 55-96922 | 5/1980 | Japan . | |

OTHER PUBLICATIONS

Craighead, et al., "New Display Based on Electrically Induced Index Matching in an Inhomogeneous Medium", Appl. Phys. Lett., vol. 40, No. 1, 1 Jan. 1982, pp. 22-24.

Primary Examiner—John K. Corbin
Assistant Examiner—Richard F. Gallivan
Attorney, Agent, or Firm—Watts, Hoffmann, Fisher & Heinke Co.

[57] ABSTRACT

A light modulating material consisting of droplets of liquid crystal in a clear or light transmitting, flexible plastic sheet or film, such as a cured epoxy. The light modulating material is prepared by dissolving liquid crystal in an uncured resin and then curing the resin so that droplets of liquid crystal spontaneously form and are uniformly dispersed throughout the sheet or film. The new material shows a reversible, high contrast optical response from an opaque scattering mode to a clear light transmission mode when either the temperature of the material is changed to transform the liquid crystal into the isotropic phase or an electric field is applied across the material. The material is optically responsive to strain, whereby under tension it acts to polarize incident light. Curing the material in the presence of an applied field also causes it to act as an electrically addressable polarizer.

47 Claims, 10 Drawing Figures

U.S. PATENT DOCUMENTS

| | | | |
|---|---|---|---|
| 4,070,912 | 1/1978 | McNaughton et al. | 73/356 |
| 4,161,557 | 7/1979 | Suzuki et al. | 428/1 |
| 4,200,361 | 4/1980 | Malvano et al. | 350/336 |
| 4,218,281 | 8/1980 | Doriguzzi et al. | 156/281 |
| 4,297,401 | 10/1981 | Chern et al. | 428/1 |
| 4,301,023 | 11/1981 | Schuberth et al. | 252/299.1 |
| 4,310,557 | 1/1982 | Davison et al. | 428/1 |
| 4,325,610 | 4/1982 | Inoue | 350/343 |
| 4,388,139 | 6/1983 | Fuller | 156/307.5 |
| 4,401,537 | 8/1983 | Chern et al. | 204/159.11 |
| 4,418,102 | 11/1983 | Ferrato | 428/1 |
| 4,427,888 | 1/1984 | Galvin | 250/331 |
| 4,468,137 | 8/1984 | Hilsum et al. | 374/160 |
| 4,470,668 | 9/1984 | Inoue et al. | 350/343 |
| 4,550,171 | 10/1985 | Mockli | 548/159 |
| 4,556,289 | 12/1985 | Fergason | 350/350 R |

LIGHT MODULATING MATERIAL COMPRISING A LIQUID CRYSTAL DISPERSION IN A PLASTIC MATRIX

RELATED APPLICATIONS

This application is a continuation-in-part of application Ser. No. 590,996 filed Mar. 19, 1984 entitled "Light Modulating Material Comprising a Liquid Crystal Dispersion in a Synthetic Resin Matrix", now abandoned.

TECHNICAL FIELD

The present invention relates generally to liquid crystal technology, and more specifically to the manufacture of a new light modulating material consisting of microdroplets of liquid crystal dispersed in a plastic matrix.

BACKGROUND ART

In a typical electrically switched liquid crystal display device, a film of liquid crystal material is sealed between two glass or plastic plates that are provided with transparent conducting electrodes. When a voltage is applied to the electrodes, the orientation of the liquid crystal is affected, altering the manner in which light is absorbed by polarizers attached to the cell or by dichroic dyes dissolved in the liquid crystal.

The cell construction and operation described above have several disadvantages. In most applications, the electrodes must be specially treated or prepared to align the liquid crystal in a particular way at the surface of the cell wall. Furthermore, it is difficult to fill and then seal the liquid crystal in the narrow region between the plates. Special techniques and materials are required for cell fabrication, particularly for mass production. Uniformity in cell thickness and preparation can be a problem and a limitation in large scale displays. The use of polarizers complicate cell construction, add to the cost and can limit the cell contrast or brightness in that they always absorb a component of incident light. Finally, the response time of a conventional liquid crystal display can be marginal for many applications.

Recent display technology has been directed toward overcoming some of these difficulties and limitations. One approach has been to develop materials which contain small regions of the liquid crystals with light scattering properties that can be electrically manipulated. Two types of such material have been suggested: materials containing encapsulated liquid crystals and materials with open or connected micropores which can be filled with liquid crystals. Such material would avoid the sealing problems of the conventional cell and could make it possible to construct large displays. Furthermore, polarizers are not required for the operation of this type of display, avoiding the limitations that dichronic polarizers create.

One prior art proposal for encapsulating liquid crystals, disclosed in French Pat. No. 2,139,537 dated Dec. 11, 1972, involves forming an aqueous emulsion of liquid crystal material with an immiscible binder such as polyvinyl alcohol. The mixture is emulsified in a high speed blender or the like to form droplets of the liquid crystal that are encapsulated by the binder. The encapulated droplets are then coated on a clear plastic substrate having the usual conducting electrodes. A similar technique is described in U.S. Pat. No. 4,435,047 issued Mar. 6, 1984.

A prior art proposal involving filling the open or connected micropores of a plastic sheet with a nematic or other type of liquid crystal is disclosed in U.S. Pat. No. 4,048,358 issued Sept. 13, 1977.

Disclosure of the Invention

The invention provides a new light modulating material comprised of droplets of liquid crystal uniformly dispersed in a clear or light transmitting, flexible plastic sheet or film, such as a cured epoxy. In comparison to prior art materials prepared by encapsulation or emulsification of liquid crystals, the new material of the invention is characterized in part by simplicity of preparation, and cell fabrication, control of droplet size, shape, spacing and distribution to provide for improved responsive features.

The new material is capable of being thermally, electrically, magnetically and electromagnetically addressed to cause the material to be reversibly switched between a light scattering mode and a light transmissive mode. The material is optically responsive to strain, whereby under tension it acts as a polarizer that transmits one component of plane polarized light while scattering the other component. Curing the material in the presence of an electric or magnetic field also causes it to act as an electrically addressable polarizer.

The light modulating material of the invention is prepared by dissolving liquid crystal in an uncured resin and then curing the resin so that droplets of liquid crystal spontaneously form and are uniformly dispersed throughout the matrix. Preferred liquid crystals are of the nematic type or those which behave as nematic type. Optimum results have been obtained with cyanobiphenyl liquid crystal.

When prepared in the manner described, the liquid crystal droplets have been observed to be of uniform size and spacing and to have a diameter ranging upward from about 0.2 microns depending primarily upon the curing procedure and the specific materials used.

One suitable epoxy resin is a mixture of epichlorohydrin and bisphenol A (part A) and a curing agent (part B). Other useful epoxy resins are those that can be cured by ultra-violet radiation. Preferred polyurethane resins have high tensile and tear strength. A suitable polyurethane is a mixture based on toluene diisocyanate, polyether glycols, methylenebisisoorthochloroaniline, and various polyols.

The physical principle of operation of the invention is based on the ability of the birefringent liquid crystal droplets to scatter or transmit light depending upon the relationship of the indicies of optical refraction of the liquid crystal and the resin matrix. In temperature responsive displays, the index of refraction of the liquid crystal in its isotropic phase is matched or similar to that of the resin so that the material will transmit incident light, while an index of refraction in the liquid crystalline phase, usually the extraordinary index, is mismatched with respect to the refractive index of the resin so that incident light is scattered and the material is opaque.

For electrically responsive uses, the ordinary index of refraction of the liquid crystal should match or be similar to the refractive index of the resin. In the absence of an electric field, incident light is scattered by the extraordinary index of refraction. In the presence of a field which aligns the liquid crystal's extraordinary index of refraction (the optic axis of the liquid crystal droplet) normal to the surfaces of the material, incident light is transmitted. When the optic axes of the liquid crystals are aligned, such as by stretching the material, the component of plane polarized incident light perpendicular to the direction of strain is transmitted, while the other component is scattered by the extraordinary index of refraction to achieve a light polarizing effect.

Temperature responsive material can be prepared in accordance with the invention using nematic, cholesteric or many different kinds of smectic liquid crystals, as well as mixtures thereof. A thermo-optic response at any particular temperature can be obtained by the use of a liquid crystal that transforms at that temperature from the liquid crystalline phase to the isotropic phase. The process is reversible so that when the temperature of the material is decreased through the isotropic to liquid crystalline phase transition, the material switches from the clear to the opaque state. Thermo-optic devices that respond to different temperatures can be made using liquid crystals having different isotropic-liquid crystalline phase transition temperatures.

As a temperature responsive material, there are several features of the invention that differ significantly from prior art materials and devices and provide important advantages. The operation of prior art cholesteric liquid crystal devices such as disclosed, for example, in U.S. Pat. No. 3,872,050, is based upon the Bragg scattering of light when the temperature dependent pitch length of the cholesteric helix becomes comparable to the wavelength of the incident light. The operation of those prior art devices which depend on phase changes of liquid crystal material, such as disclosed in U.S. Pat. No. 4,279,152, requires altering the ordering of dye molecules in order to change light absorption properties. In the material of this invention, the temperature resolution between the white opaque and clear states is governed by the width of the isotropic to liquid crystalline phase transition and as such is an improvement over the temperature resolution of conventional cholesteric devices which depend upon the width of the visible spectrum and the temperature dependence of the pitch length of the cholesteric helix. Another advantage of the invention is that visual contrast between the on and off states is controlled by the contrasting light scattering properties of the dispersed liquid crystal in the isotropic phase relative to that in the liquid crystalline phase, whereas in the cholesteric liquid crystal temperature indicators of the prior art, the visual contrast is governed by the Bragg scattering properties of the twisted cholesteric material relative to a background substrate.

The present invention also permits the use of a wide variety of liquid crystals and phases, including those which have high thermal stability and lifetime. The cholesteric liquid crystal indicators of the prior art have been restricted to cholesteric or chiral materials which have the appropriate temperature dependence of the pitch length. Such liquid crystals can have poor stability so that displays constructed with them have limited lifetime.

Electro-optic or magnetic-optic responsive material is prepared using nematic liquid crystal, or mixtures that incorporate and behave as a nematic. As used herein, the term "nematic" means nematic liquid crystal and liquid crystal mixtures having the properties of a nematic. The dispersed nematic liquid crystal in its resin matrix is placed between two conducting surfaces, one or both of which are transparent. When a voltage of the appropriate magnitude is applied to the conducting surfaces, the material will switch from a white opaque state to a clear state. The process is reversible upon removal of the voltage. If desired, a pleochroic dye can be incorporated into the liquid crystal to enhance the visual contrast between the clear and opaque states of the electrically responding material. By using a black dye, for example, the material will appear black in the opaque state.

As an electrically responsive material, the invention has features and advantages different from other known voltage or current responsive materials involving liquid crystals. With the material of the invention, an electric field from an a.c. or d.c. voltage source applied to the conductors on the surfaces of the material aligns the optic axes of the nematic liquid crystal droplets and the extraordinary index of refraction of the liquid crystal parallel to the electric field so that light is transmitted. Upon removal of the applied electric field, the surface interactions between the resin matrix and the dispersed nematic liquid crystal rapidly restore the random alignment of the optic axes to the condition existing prior to the application of the electric field to achieve light scattering by the extraordinary index of refraction. The large number and small size of the dispersed liquid crystal droplets provide for a large surface area to volume ratio between the epoxy and the liquid crystal to bring about the switching effect. An important characteristic of the invention is that the droplets can be readily shaped to yield fast switching times. With the material of the invention, the clear state to the opaque state response time can be made in approximately 1-10 milliseconds. When a pleochroic dye is incorporated into the liquid crystal the principle of operation remains different from other guest-host displays incorporating pleochroic dyes in that it is the resin-liquid crystal surface interactions and the large surface-to-volume ratio of the dispersed liquid crystal that restores the nematic directors and hence the guest dye component to its random opaque state orientation upon removal of an applied electric field. This is in contrast to known "phase change" dichroic display cells in which a cholesteric component is added to the liquid crystal to cause or induce random alignment of the dye in the opaque state.

One specific embodiment of an electrically responsive display cell incorporates a strained sheet or film prepared in the manner described above. In the presence of an electric field which aligns the extraordinary index of refraction normal to the surfaces of the sheet or film, unpolarized incident light is transmitted through the cell. In the absence of an electric field, the extraordinary index of refraction is parallel to the direction of strain, with the result that one component of plane polarized incident light is transmitted and the other component is scattered. The switch time of the stretched material is about 1 millisecond compared to 10-100 milliseconds with unstretched material. Such a cell can act as a light switch when incorporated with a second polarizer.

Another embodiment of an electrically responsive polarizing material may be made with liquid crystal droplets in a cured polyurethane film sandwiched between glass slides. Translating the slides relative to one another in the opposite directions strains the film. The strained film scatters light polarized along the axis of strain and is transparent to light polarized perpendicular to the axis of strain. Application of an electric field will switch the film to a non-polarizing transmitting state. Unstrained film may be switched from a non-polarizing scattering state to a non-polarizing transmitting state by the application of an electric field.

An important feature of the present invention is the novel technique of curing the resin with dissolved liquid crystals in the presence of an applied magnetic or electric field of sufficient strength to cause the liquid crystals in the droplets to align. The liquid crystals within the droplets are aligned during curing. Once the curing process is complete, the alignment becomes permanent and persists upon removal of the applied field. This field-alignment phenomenon allows the fabrication of switchable light polarizers. A switchable light polarizer which polarizes light in the absence of an applied voltage is made by selecting a liquid crystal with a positive anisotropy in the dielectric as well as diamagnetic susceptibility. A film of the liquid crystal dissolved in resin is cured in the presence of a magnetic field directed in the plane of the film. When cured, the optic axes of the liquid crystal droplets are aligned in the plane of the film. The cured film polarizes light. Placing the cured film between transparent electrodes and applying a voltage of sufficient strength causes the polarizing effect to be switched off.

A switchable polarizer which polarizes light in the presence of an applied field is made by selecting liquid crystals having a positive dielectric anisotropy and curing a solution of the liquid crystal in resin in an a.c. field created by applying voltage to conducting surfaces on the curing film. When cured, the optic axes of the liquid crystal droplets are aligned in a direction normal to the film surface. The cured film is clear and non-polarizing. Application of an electric or magnetic field in the plane of the film causes the film to switch to a polarizing state.

Optically switchable polarizers can be fabricated by curing a liquid crystal-resin solution in the presence of an applied field which causes the optic axis of the liquid crystal droplets to align normal to the film surface. The cured film is clear and non-polarizing. A high intensity electromagnetic source will cause the optic axes of the droplets to reorient so that the film becomes opaque and light scattering.

Display materials with improved light scattering properties can be fabricated with films containing droplets distorted by a compressive strain applied to the film. The distortion aligns the extraordinary index of the refraction of the liquid crystals parallel to the surface of the film, but random in the plane of the film. In the absence of an applied field, this film scatters light and appears opaque; it can be switched to a clear state by the application of an a.c. voltage of sufficient strength to switch the optic axes of the liquid crystals to a direction normal to the surface. A display formed from this material would be expected to have improved contrast over displays made with spherical droplets in that the index mismatch is maximized in such films in the scattering state. A compressive strain can be conveniently made by suitable adjustment of the curing temperature such that contrasting thermal expansivities between the cell walls and the resin-liquid crystal material induces the compressive strain at operating temperatures.

In accordance with the foregoing, one feature of the invention is the provision of a new light modulating material comprising microdroplets of liquid crystal dispersed in a light transmissive, solid sheet or film of a cured resin, the liquid crystal having been dissolved in the uncured resin and the microdroplets having been formed spontaneously upon curing.

Another feature of the invention is the provision of a temperature responsive, light modulating material as described in the previous paragraph which is further characterized in that the liquid crystal has an optical index of refraction in the isotropic phase that is similar to the refractive index of the resin and an index of refraction in the liquid crystalline phase that is mismatched with the refractive index of the resin.

Still another feture of the invention is the provision of an electrically responsive, light modulating material and device characterized by a solid sheet or film of light transmissive, cured resin containing dispersed microdroplets of nematic liquid crystal having an ordinary index of refraction similar to the refractive index of the resin so that light is transmitted in the presence of an electric field and having its other index of refraction such that incident light is scattered in the absence of the field, the liquid crystal being soluble in the uncured resin and the microdroplets being spontaneously formed during curing.

A further feature of the invention is the provision of a light polarizing material comprising microdroplets of liquid crystal dispersed in a sheet or film of a light transmissive cured resin, the liquid crystal having an ordinary index of refraction similar to the refractive index of the resin and being soluble in the uncured resin with the microdroplets being spontaneously formed during curing, and the material being strained to align the optical axes of the microdroplets in the direction of strain.

An additional feature of the invention is the provision of an electrically addressed, light polarizing device incorporating the material described in the previous paragraph which is further characterized in that the liquid crystal is a nematic having an ordinary index of refraction similar to the refractive index of the resin, whereby light is transmitted through the device unpolarized in the presence of an electric field.

Another feature of the invention is the provision of a light modulating material comprising a light transmissive plastic containing dispersed microdroplets of nematic liquid crystal having an ordinary index of refraction similar to the refractive index of the plastic, the material being characterized in that the optical axes of the microdroplets are aligned in one direction. According to a preferred method of manufacture, the material is made by curing the resin in a field that is effective to align the optical axes of the microdroplets during curing.

In one specific embodiment of the invention, the material described in the previous paragraph is made so that the optical axes are normal to the plane of the sheet, whereby incident light is transmitted unpolarized. In the presence of an electric, magnetic or electromagnetic field, the optical axes are oriented in another direction effective to scatter at least one component of incident light. In another specific embodiment, the material described in the previous paragraph is prepared so that the optical axes are aligned in one direction in the plane of the sheet, whereby the material acts as a light polarizer, and whereby the optical axes are aligned normal to the plane of the sheet in the presence of a field so that light is transmitted unpolarized.

Still other features and advantages and a full understanding of the invention will become apparent to those skilled in the art from the following description of the best modes and the accompanying drawings.

BEST MODES FOR CARRYING OUT THE INVENTION

Figure 1:
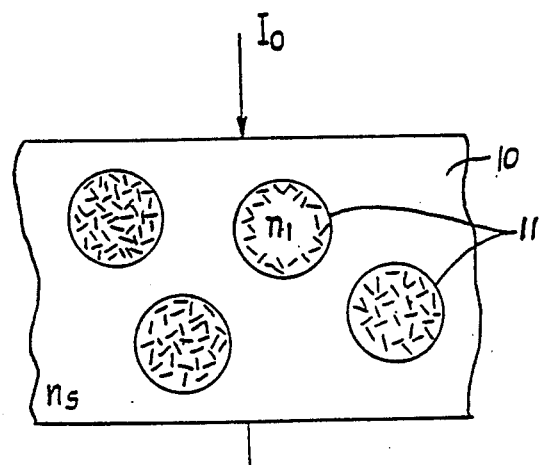
FIG. 1 is a fragmentary, schematic illustration in cross-section of a resin-liquid crystal material in which the liquid crystal droplets are in the isotropic phase and the material is in a clear state.

Referring now to the drawings, FIG. 1 illustrates a preferred display material of the invention consisting of cured, clear resin matrix 10 which contains droplets 11 of liquid crystal. As shown in FIG. 1, the liquid crystal component is at a temperature such that it is in a clear isotropic phase. The liquid crystal is selected so that its optical index of refraction in the isotropic phase, $n_i$, has a value similar to that of the clear resin, $n_s$, so that light, as at $I_o$, incident upon the material will pass readily through it unscattered, as at $I_T$. The material in the condition illustrated in FIG. 1 is referred to as being in the clear state.

Figure 2:
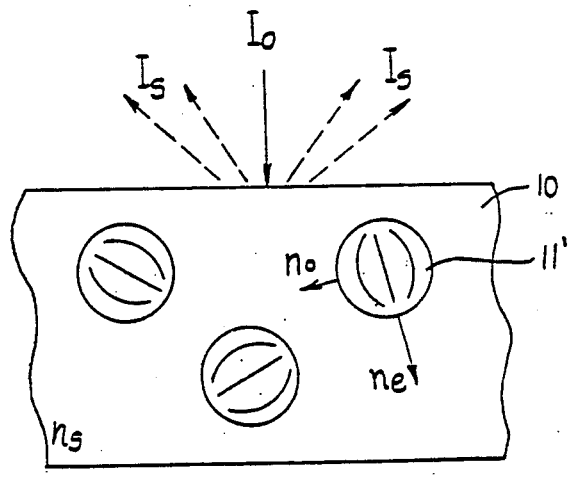
FIG. 2 is an illustration similar to FIG. 1 except that the liquid crystal droplets are in the liquid crystalline phase and the material is in an opaque state.

FIG. 2 illustrates the same material except that the liquid crystal component 11′ is in a liquid crystalline phase. The liquid crystalline phase can be a nematic, cholesteric or smectic phase or mixtures thereof. When in the liquid crystalline phase, the index of optical refraction, i.e., the extraordinary index of refraction $n_e$, is different from that of the isotropic phase and that of the resin matrix 10 so that incident light, as at $I_o$, will be scattered by the liquid crystal, as at $I_s$. The mismatch between the index of refraction of the resin matrix, $n_s$, and that of the liquid crystal, $n_e$, and the light scattering properties of the liquid crystal droplets cause the material to scatter light. The material in the opaque state illustrated in FIG. 2 appears as a white opaque texture. The resin matrix containing the liquid crystal switches from a clear state to a white opaque state as the temperature is decreased to change the liquid crystal from the isotropic to the liquid crystalline phase.

Figure 3:
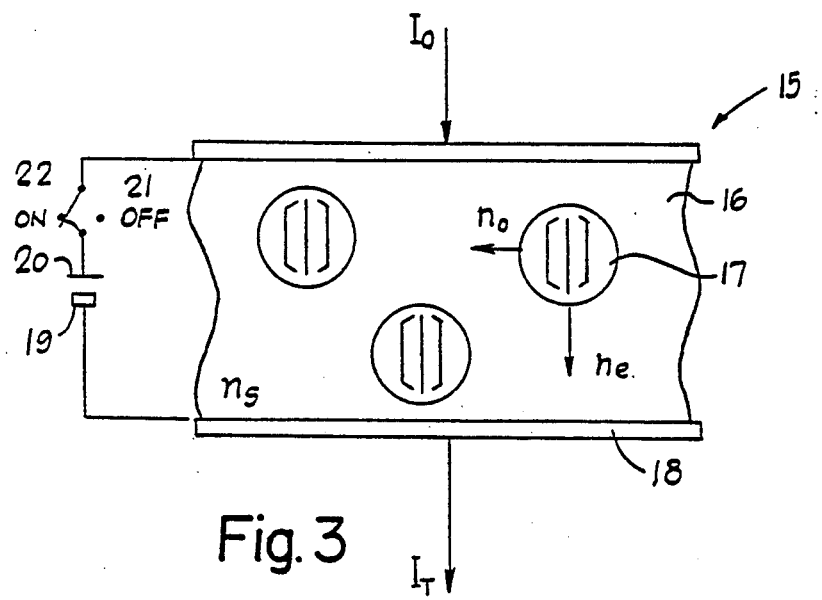
FIG. 3 is a fragmentary, schematic view in cross-section of the resin-liquid crystal material incorporated in an electrically actuated device.

FIG. 3 illustrates an electro-optic responsive device 15 capable of being reversibly switched between the opaque and clear states. A clear resin 16 containing dispersed microdroplets 17 of liquid crystal having an ordinary index of refraction $n_o$ similar to the refractive index of the resin is sandwiched between electrical conductors 18, one or both of which are transparent. A voltage source 19 is connected to the conductors 18 by a switch 20 having off and on positions 21, 22 respectively. As illustrated in FIG. 5, when an electric field is applied across the resin-liquid crystal material by closing the switch 20, the material appears in the light transmissive or clear state. The application of the electric field has the effect of aligning the extraordinary index of refraction $n_e$ of the liquid crystal in a direction normal to the surface of the film thereby allowing incident light as at $I_o$ to pass through the display device 15 unscattered to emerge as at $I_T$. When the voltage source 19 is disconnected by placing the switch 20 in its off position 21, surface interactions at the droplet wall between the liquid crystal and the resin return the droplets to their random orientation as illustrated in FIG. 2 so that the resin-liquid crystal material of the device appears as a white opaque texture.

Figure 4:
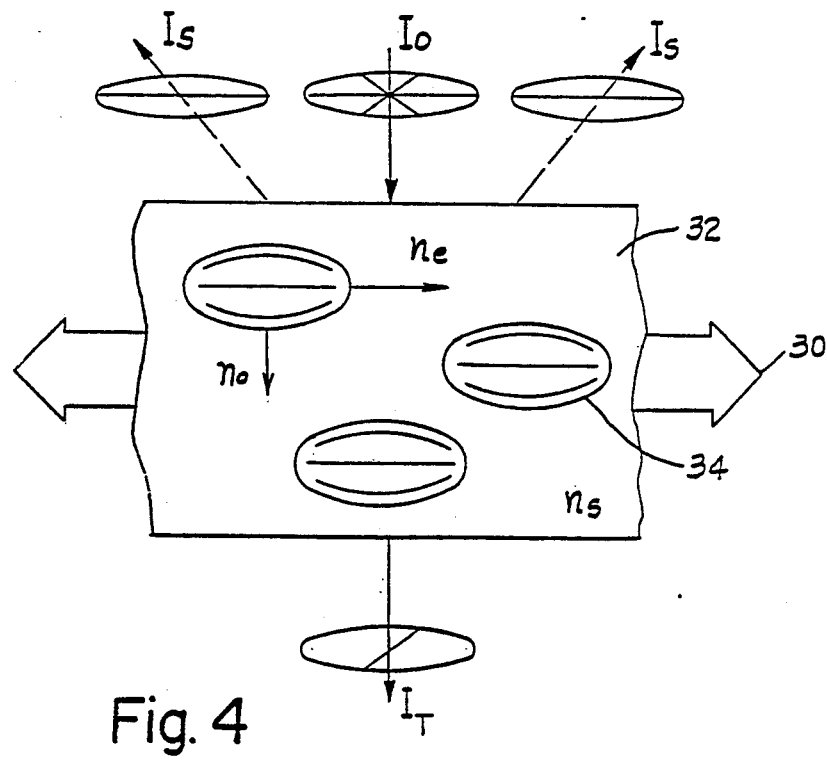
FIG. 4 is a fragmentary, schematic illustration in cross-section of the resin-liquid crystal material in a stretched condition.

FIG. 4 illustrates the optical response that is obtained when the display material of the invention is stretched by creating a mechanical strain, as indicated by the arrows 30. The cured, clear resin is designated by reference numeral 32 and the microdroplets of liquid crystal that are elongated in the direction of stretch are designated by reference numeral 34. The liquid crystal can be nematic, smectic or cholesteric or a mixture thereof in the liquid crystalline phase. Preferably, the ordinary index of refraction $n_o$ of the liquid crystal is similar to the refractive index $n_s$ of the resin.

Stretching of the material results in a distortion of the liquid crystal droplet. The spherical droplet adopts an elliptical shape with the long axis of the ellipse parallel to the direction of stretch. This distortion of the droplet results in the liquid crystal within the droplet aligning itself with the long axis of the ellipse. The result is that upon stretching all liquid crystal droplets will have their optic axes and hence their extraordinary index of refraction, $n_e$, aligned with the direction of stretch. Unpolarized incident light, as at $I_o$, will have components which are parallel to the stretch direction and parallel to the optic axes of the droplets. These components will experience a large difference between the refractive index of the liquid crystal droplet, $n_e$, and that of the surrounding resin, $n_s$, and will be scattered. Components of the incident light in a direction orthogonal to the direction of stretch will encounter a refractive index within droplet that is similar to the resin and will pass through the film unaffected. The film therefore acts as a light polarizer. In addition to the polarizing effect, it has been found that the application of mechanical stress to the liquid crystal-resin material embodied in an electro-optic cell as shown in FIG. 3 decreases the switch time between the field-on and field-off states.

Figure 5B:
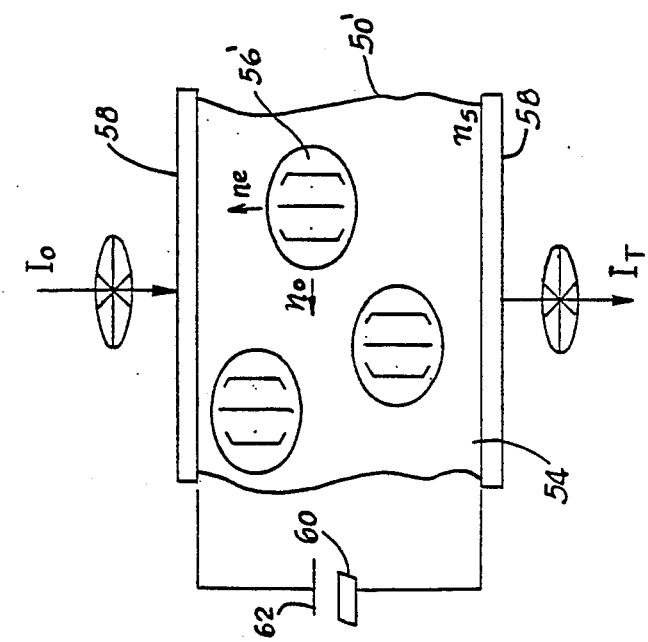
FIG. 5(b) is fragmentary, schematic illustration in cross-section of the film of FIG. 5(a) incorporated in an electrically actuated device.
Figure 5A:
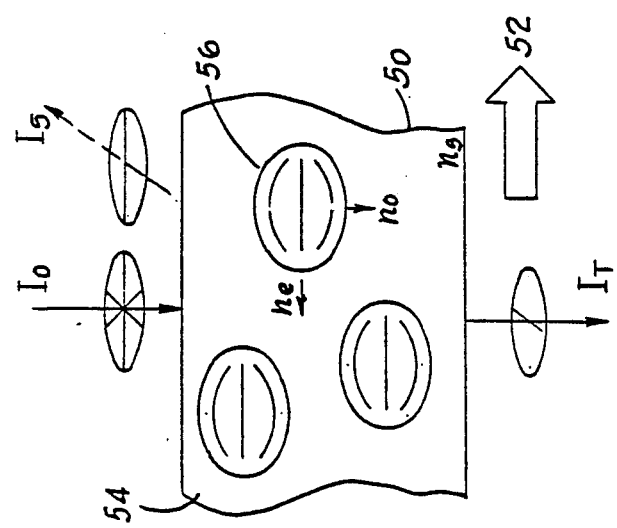
FIG. 5(a) is a fragmentary, schematic illustration in cross-section of the resin-liquid crystal film cured in an applied field directed in the plane of the film.

FIG. 5(a) illustrates a scattering polarizer 50 that is obtained when the material of the invention is cured in the presence of a magnetic or electric field, as indicated by the arrow 52. The cured, clear resin is designated by reference numeral 54 and the droplets of liquid crystal having their extraordinary index of refraction $n_e$ aligned in one direction in the plane of the film are designated by reference numeral 56. The liquid crystal has a positive anisotropy in the dielectric and diamagnetic susceptibility. When cured in the presence of an a.c. electric field or magnetic field of sufficient strength to orient the liquid crystal droplets during the curing process, the droplets will retain that orientation upon removal of the field. The film will serve as a light polarizer similar to that of the stretched film described above in connection with FIG. 4.

Components of incident unpolarized light, as at $I_o$, which are parallel to the direction of alignment of the extraordinary index of refraction will be scattered, as at $I_s$, due to the mismatch between the index of refraction of the resin $n_s$ and the aligned optical axes $n_e$ of the liquid crystal droplets. Incident light polarized orthogonal to the direction of alignment will encounter no difference between the ordinary index of refraction $n_o$ of the droplet 56 and that of the resin $n_s$ and will be transmitted polarized as at $I_T$. The scattering polarizer 50 of FIG. 5(a), as well as the stretched film of FIG. 4, can be switched to a non-polarizing light transmissive state in a manner shown in FIG. 5(b), where the resin 54 containing the droplets as at 56' is sandwiched between electrical conductors 58, both of which are preferably transparent. A voltage source 60 is connected to the conductors 58. The application of the electric field has the effect of aligning the extraordinary index of refraction normal to the surface of the film thereby allowing incident light to pass through unpolarized. When the voltage source 60 is disconnected by placing the switch 62 in its off position the droplets relax to their equilibrium orientation illustrated in FIG. 4 and FIG. 5(a) and the display material again polarizes incident light.

Figure 6B:
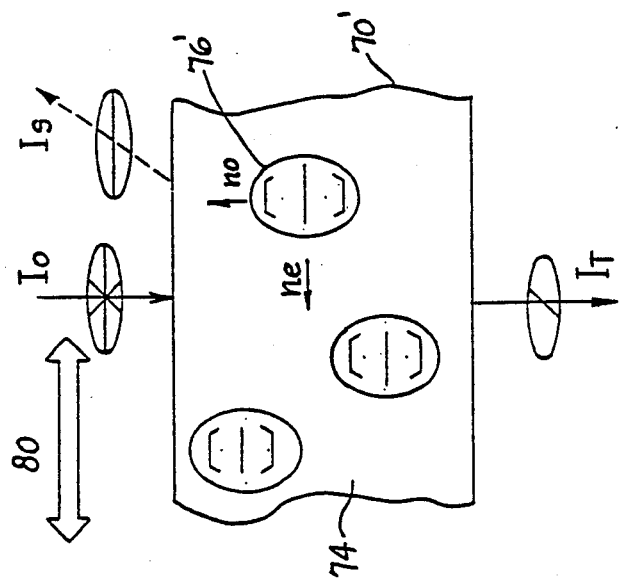
FIG. 6(b) is a schematic illustration of the film of FIG. 6(a) in an applied field directed in the plane of the film.
Figure 6A:
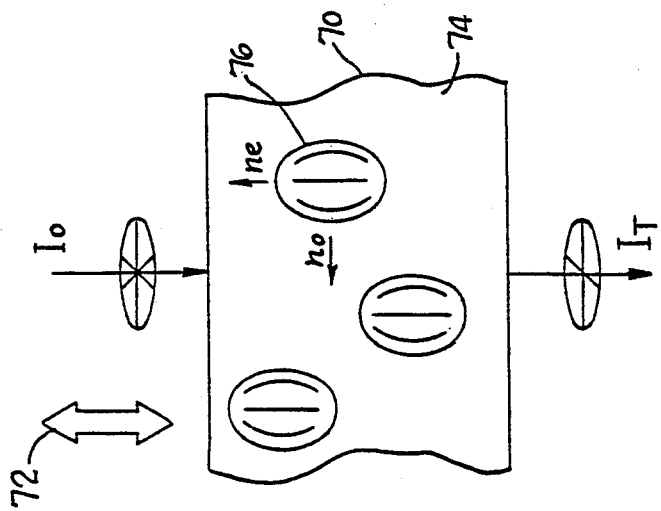
FIG. 6(a) is an illustration similar to FIG. 5(a) showing a resin-liquid crystal film cured in a field normal to the plane of the film.

FIG. 6(a) illustrates a film 70 that is obtained when the material of the invention is cured in the presence of a.c. electric or magnetic field as indicated by the arrow 72. The cured, clear resin is designated by the reference numeral 74. The droplets of liquid crystal having their extraordinary index of refraction $n_e$ aligned normal to the surface of the film are designated by the numeral 76. The liquid crystal has a positive dielectric or diamagnetic anisotropy. Incident light as at $I_o$ encounters no difference between the extraordinary index of refraction $n_e$ of the droplet and the refractive index $n_s$ of the resin and is transmitted unscattered as at $I_T$. The film appears clear. FIG. 6(b) illustrates the film of FIG. 6(a) when subjected to an applied field in the plane of the film as indicated by the arrow 80. The field may be a magnetic field, an electric field or an electromagnetic field such as that created by a high intensity light source. The application of the field has the effect of aligning the extraordinary index of refraction $n_e$ in the plane of film. Components of unpolarized incident light in a direction parallel to the direction of alignment of the extraordinary index of refraction will encounter a mismatch between the extraordinary index of refraction of the droplet and the index of the resin and will be scattered. Components of unpolarized incident light in a direction orthogonal to the direction of alignment of the extraordinary index of refraction will encounter no such mismatch and will pass through the device as polarized light, as at $I_T$.

Figure 7B:
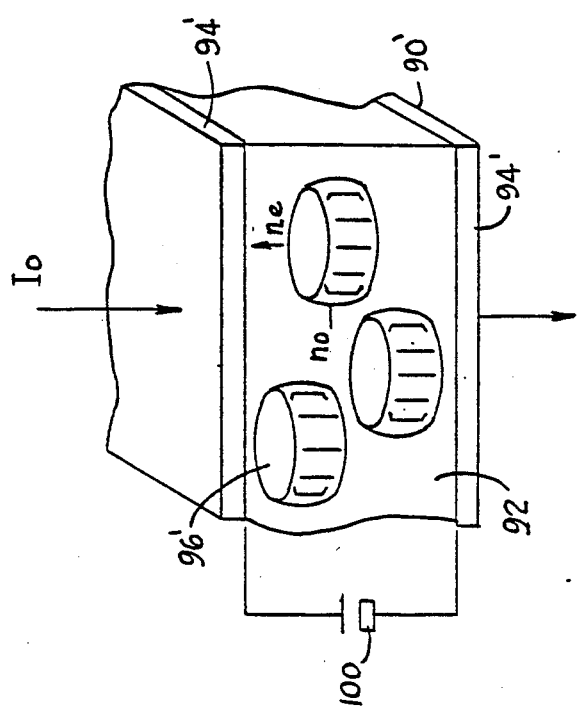
FIG. 7(b) is a fragmentary, schematic illustration in cross-section of the film of FIG. 7(a) incorporated in an electrically actuated device.
Figure 7A:
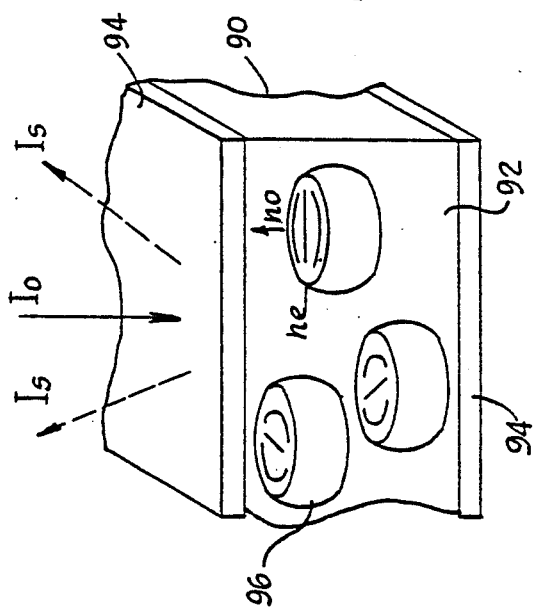
FIG. 7(a) is a fragmentary schematic illustration in elevation of a resin-liquid crystal film in a stressed condition such that the optic axes are randomly oriented in the plane of the film.

FIG. 7(a) illustrates a film 90 that is obtained when the material of the invention is strained by a squeezing which occurs when the material is cured at a temperature such that there is a mismatch between the thermal expansivity of the resin 92 and that of constraining cell walls 94. The disk-like droplets of liquid crystal having their extraordinary index of refraction aligned parallel to the surface of the film but random in the plane of the film are designated by the numeral 96. Incident light will be scattered due to the mismatch between the extraordinary index of refraction of the droplets 96 and the resin 92, and the device will appear opaque. The disk-like droplets of FIG 7(a) will have an enhanced scattering effect as compared to the spherical droplets of FIG. 2, since $n_e$ lies in the plane of the film for all the droplets 96. FIG 7(b) shows the resin 92 containing droplets 96' sandwiched between conducting electrodes 94'. The dielectric anisotropy of the liquid crystals is positive and application of a voltage across electrodes 94' causes the extraordinary index of refraction to align in a direction normal to the film surfaces. Light incident upon the device will detect no difference between the indices of refraction of the droplets 96' and the resin 92 and will be transmitted unscattered resulting in a clear device. Such films exhibit improved display contrast over films with spherical droplets.

The material described in conjunction with FIGS. 1–7 may be prepared by mixing together an uncured resin such as epoxy or polyurethane and the liquid crystal. Addition of the preferred cyanobiphenyl liquid crystals to an uncured resin appears to result in a true solution of liquid crystals in the resin. Prior to curing, the liquid crystals in the solution do not appear to scatter incident light and the solution appears clear.

The cyanobiphenyl liquid crystal readily dissolves in uncured resin so that only gentle mixing is necessary to form a homogeneous solution. In order to remove air bubbles which may appear during mixing, the solution can either be centrifuged or placed in an evacuation chamber prior to curing.

As the liquid crystal-resin solution is cured, the resin begins to solidify. As solidification of the resin occurs, the liquid crystal molecules become immiscible in the resin and aggregate into droplets. When the resin is fully solidified, pockets or droplets of liquid crystals in the liquid crystalline phase are found entrapped within the solid phase. The droplets appear to be uniformly dispersed throughout the solid and spherical in shape. The size, shape and spacing of the droplets depend upon a number of factors such as the temperature at which the resin is cured, the types of resin and liquid crystal material used, the relative amounts of those materials, and the manner and rate of curing. The materials of FIGS. 1–7 also can be prepared using epoxy resins cured by ultraviolet radiation and the like.

Thermo-optic materials that respond to different temperatures are easily prepared using liquid crystals with different isotropic-liquid crystalline phase transition temperatures. They can also be prepared using mixtures of different liquid crystal materials. With currently existing nematic liquid crystals, it is possible to obtain a liquid crystal with an isotropic-nematic phase transition at any temperature within the range from $-30°$ C. to $250°$ C.

The cured resin containing the dispersed liquid crystal microdroplets is normally a flexible solid and can be cut or cast into films or large articles. The thermo-optic material has applicability in high resolution, high visual contrast thermometers or temperature indicators which can, for example, be used in medical or other technologies, cold food packaging, refrigeration, ice detection on road surfaces, and medical thermograms for the detection of breast cancer, the location of the placenta, etc. The thermo-optic material also can be used in thermally addressed high contrast, wide viewing angle, flat panel displays. Such displays can be electrically addressed by a resistant or Joule-Thomson effect device to locally change the temperature of the material. The material can also be addressed by a high intensity light beam to locally heat the material surface.

Electro-optic displays and polarizing devices as illustrated in FIGS. 3, 5(b) and 7(b) can be constructed by deposition or painting of transparent conductive coatings on the surfaces of the material or by curing the resin while sandwiched between two plates containing transparent conductive coatings. The visual contrast between the opaque and clear states can be enhanced by a suitable background such as one which is dark or lighted.

Electro-optic displays that are black or colored in the opaque state can be constructed by the addition of a dichroic dye to the liquid crystal. For example, an electro-optic display as in FIGS. 3 or 7(b) which is black when no voltage is applied but white when a voltage is applied can be constructed by the use of nematic liquid crystal containing a black pleochroic dye. Such a liquid crystal when cured in a clear resin and placed on a white background can achieve a white on black display.

A scattering polarizer film as illustrated in FIG. 4 can be used as a strain monitor. The direction of strain placed on the film controls the direction in which the film polarizes. A change in the direction or magnitude of the applied strain results in a change in the direction or degree of polarization. The change of polarization can be monitored by viewing the film through a polarized lens.

Electrically addressable scattering polarizers can be fabricated by stretching or by curing in the presence of a field as illustrated in FIGS. 4 and 5(b), respectively. A voltage of sufficient magnitude applied to transparent conductors on one of these films aligns the optic axes of the droplets normal to the surface of the film and causes the polarizing effect to be switched off and the film to appear transparent. Such a material is useful in display windows or other devices where it is desirable to switch the polarizing effect off and on.

Optically switchable materials can be fabricated with films prepared by curing in the presence of an applied field or by straining so that the extraordinary index of refraction, ne, is aligned normal to the surface of the film. Such a film is clear and transmits light at normal light intensities. Incident light of sufficiently high intensity will cause the liquid crystals to reorient so that the optic axes of the droplets are switched to a direction in the plane of the film. This film will scatter light and appear opaque. The film acts as a non-linear optical device to be used as a protective coating to a high intensity electromagnetic source or as a device in optical computing. A non-linear optical response is also possible in which high intensity incident light changes the value of the refractive indices of the liquid crystal relative to the index of the resin.

The best modes of the invention are further illustrated and described by the following specific examples.

EXAMPLE I

A high contrast temperature responsive material was prepared using a two-component epoxy material sold under the trade designation Bostik 7575 by Emhart Chemical Group, Bostik Division and the liquid crystal. Part A of the epoxy resin was an equimolar mixture of bisphenol A and epichlorohydrin. Part B was a fatty polyamine curing agent. The liquid crystal (available as E-8 from EM Industries) was a mixture consisting of (by weight): 4'n-pentyl-4'-cyanobiphenyl (5CB), 43 wt %; 4'-n-propoxy-4-cyanobiphenyl (3OCB), 17 wt %; 4'-n-pentoxy-4-cyanobiphenyl (5OCB) 13 wt %; 4'-n-octyloxy-4-cyanobiphenyl (8OCB) 17 wt % and 4'-n-pentyl-4-cyano-terphenyl (5CT) 10 wt %.

Part A and part B of the epoxy resin and the liquid crystal were mixed in equal proportions by volume according to the prescription 33⅓% part A, 33⅓% part B and 33⅓% liquid crystals. All three components were mixed together by gentle stirring for three minutes to form a homageneous solution. The solution was then centrifuged for 1 minute to remove bubbles incorporated in the stirring process. Samples were prepared by spreading the uncured material with a uniform thickness on glass plates. After curing for 48 hours, the samples that were about 200 microns thick had a pure white opaque texture (opaque state). Samples having a film thickness between 10 and 200 microns were also white in appearance, but were less opaque. The films were peeled from the glass surfaces to yield a solid flexible material. When these films were heated to the nematic-isotropic phase transition temperature near 80° C., they abruptly become clear or transparent (clear state). The films remained clear at temperatures above 80° C. and returned to a pure opaque condition when cooled below 80° C. The contrast between the opaque and clear states depended on the film thickness. Thickness of 200±100 microns showed high visual contrast between the opaque and clear states. The nematic isotropic transition temperature exhibited by the clear and opaque states of the film was very near the nematic-isotropic transition temperature of the liquid crystal prior to disperison in the epoxy resin.

EXAMPLE II

An electrically responsive device using the same material described in Example I was constructed. In this example, the uncured mixture of Example I after centrifuging was sandwiched between two glass slides having indium oxide conductive coatings on their surfaces adjacent to the mixture. An insulating spacer (Teflon tape) was used between the glass slides to control the film thickness to approximately 75 microns. The film had a pure white opaque texture after 24 hours of curing (opaque state). When an a.c. voltage of 100 volts was applied to the conducting surfaces of the glass plates, the material turned clear (clear state). A film thickness of less than 10 microns showed less visual contrast between the clear and opaque states, and also required a smaller switching voltage. A dark or reflective background on the display was found to improve the on-off visual contrast.

A sample of area 2.0 cm$^2$ with an applied voltage of 100 volts was observed to draw $5 \times 10^{-8}$ A in the clear state giving a driving power of $5 \times 10^{-6}$ watts.

EXAMPLE III

An electrically responsive guest-host device that was an opaque blue in the opaque state and clear in the clear state was constructed by the addition of a blue dye to the liquid crystal mixture. The blue dye was 1-(p-n-butylphenylamino)-4-hydroxyanthraquinone. It was added to the liquid crystal mixture of Example I, according to the proportion 1.5% by weight blue dye to 98.5% by weight liquid crystal. This mixture was then mixed with part A and part B of the epoxy resin of Example I in the proportion (by volume) 33⅓% part A, 33⅓% part B and 33⅓% blue dye and liquid crystal. As in Example II, the material was allowed to cure between two glass slides with conductive surface coatings. In this example, a larger visual contrast between the clear and opaque states was obtained with smaller film thickness and hence lower voltages were applied to the conducting surfaces. A display having a thickness of about 10 microns was found to be driven into the clear state with an applied voltage of 25 volts.

EXAMPLE IV

A temperature responsive film was made using the liquid crystal mixture of Example I and a two-component fast curing epoxy resin (trade designation EPO-TEK 302) consisting of bisphenol A resin, part A, and an aliphatic curing agent (part B). The epoxy resin and liquid crystal were mixed in the proportion (by volume): 25% part A, 25% part B, and 50% liquid crystal. The film preparation procedure used was identical to that of Example I. After a curing time of two days the film had an opaque white texture at temperatures below the liquid crystal isotropic-nematic transition temperature (80° C.), but was clear above that temperature.

EXAMPLE V

A mechanical stress and temperature responsive material with light polarizing properties was prepared by the dispersion of the liquid crystal 4'-octyl-4-cyanobiphenyl (available as K-24 from EM Industries) by mixing it with a two-component epoxy resin in the proportion (by volume): $33\frac{1}{3}$% part A, $33\frac{1}{3}$% part B, and $33\frac{1}{3}$% liquid crystal. The epoxy resin consisted of an equimolar mixture of bisphenol A and epichlorohydrin (part A , and a fatty polyamide curing agent, part B, purchased from Bostik Division, Milano, Italy. Two samples were prepared, one using K-24 as the liquid crystal and another using a mixture (by volume) of 75% K-24 and 25% anisylidene-p-butylaniline. The stirring procedure of the mixture was identical to that of Example I. A film of thickness about 50 microns was prepared by letting the mixture cure between a microscope glass slide and a plastic cover slip. Once the mixture was cured, the plastic cover slip was easily removed so the film could be easily peeled off the glass substrate. A uniformly flat, shinny and flexible material was obtained that was opaque at room temperature.

Upon stretching this film unidirectionally, it became more transparent. The light passing through the stretched film was observed to be linearly polarized in a direction perpendicular to the stretching direction. Upon heating the material to a temperature whereby the liquid crystal was in the isotropic phase, the material became clear and no polarization was observed either in the free or in the stretched condition. Instead of a stretch, a shear or simply unidirectional pressure served to produce the same polarizing effect.

EXAMPLE VI

An electro-responsive cell with light polarizing properties was prepared by mixing the following substances in the following order: Epoxy part B, 32.5% (by weight); nematic liquid crystal, 33.5%; spacer material, 0.7%; Epoxy part A, 33.3%. The epoxy was the same as that described in Example V. The nematic liquid crystal (available as E-7 from EM Industries) was a mixture of (by weight) 4'-n-pentyl-4-cyano-biphenyl (5CB), 51%; 4'-n-heptyl-4-cyano-biphenyl (7CB), 21%; 4'-n-octoxy-4-cyano-biphenyl, 16%; and 4'-n-pentyl-4-cyano-terphenyl, 12%. The spacer material was a powder with a particle size of 26 μm (supplied as Alufrit PS-26 by the Atomergic Chemicals Corporation). While the mixture of liquid crystal and epoxy was still in its uncured, fluid state it was placed between two glass slides with transparent conductive coatings to which a voltage could be applied. The material was then cured for five days at −24° C. Upon subsequent warming to room temperature, the disparate coefficients of expansion of the glass slides and the epoxy resin matrix caused the matrix and the droplets of the liquid crystals dispersed in the matrix to be strained so that light passing through the material was linearly polarized as evidenced by the extinction of light viewed through a crossed polarizing lens. A voltage of 30 volts a.c. was then applied to the conductive coatings and the responsive material was switched to a state in which transmitted light was only faintly polarized.

EXAMPLE VII

An electro-responsive cell was constructed from a flexible epoxy resin-liquid crystal sheet stretched and sandwiched between two transparent conducting surfaces. The flexible epoxy resin-liquid crystal sheet was prepared by first mixing liquid crystal with epoxy Part B, then adding Part A in 1:1:1 proportions. The liquid crystal was the same as in Example IV. Part A was an equimolar mixture of bisphenol A and epichlorhydrin; Part B was a chemical curing agent (both available from Bostic Division, Milan, Italy). The epoxy resin-liquid crystal mixture was allowed to cure between two plexiglass sheets spaced about 50 μm apart. After curing for one day, the resultant opaque white flexible sheet was removed from the plexiglass. The sheet was stretched by about 5 to 10% in one direction and sandwiched between two glass slides. Each slide was coated on one side with a transparent conductive coating. The sandwich was constructed so that the conductive coatings faced the stretched sheet. A linearly polarizing film was oriented with the sandwiched, stretched sheet to achieve maximum extinction of transmitted light and then attached to the sandwich.

Another cell was constructed as described, except that the opaque white flexible sheet was not stretched before being sandwiched between the conductive glass slides.

When a voltage of 200 volts was applied to the cell with stretched material, the response time between opaque and clear states was in the order of one millisecond. The cell with unstretched material responded in 25–40 milliseconds.

EXAMPLE VIII

A dispersion of liquid crystals in a flexible solid epoxy matrix was made by curing an epoxy-liquid crystal formulation by ultraviolet light. The epoxy formulation was a mixture of 3.8 grams of resin (Shell brand EPON resin 828), 0.4 grams of UV activated epoxy curative (3M brand FC-508) and 0.9 grams of trimethylene glycol. The liquid crystal was the same as that described in Example VI. A solution was made by first mixing 0.3 grams of the epoxy formulation with 0.1 grams of the liquid crystal. The solution was then cured for thirty minutes under an ultraviolet lamp. The cured material appeared an opaque white, but when heated turned clear at the nematic liquid crystal isotropic transition temperatures, thereby acting as a thermally responsive light switch. The flexible solid, opaque dispersion material also became partially clear upon stretching. The transmissive light through the stretched material was observed to be linearly polarized and would extinguish light when a crossed polarizer was placed either in front or behind the stretched material. The material only needed to be stretched 5–10% of its original length to show polarization effects. A slight compression or other mechanical distortion also showed polarization effects. When viewed through a cross polarizer the material acted as a mechanically responsive light switch.

EXAMPLE IX

A scattering polarizer was made using the same liquid crystal described in Example VII and Bostik, parts A and B (Bostik S.p.A., Milan, Italy). The ratio of Bostik parts B and A was 1:0.94, respectively; a mixture of parts A and B and liquid crystal was made using 33 wt % of E-7. 0.1 wt. % spacer material was added to the mixture. The spacer material was a powder with a particle size of 26 μm (supplied as Alufrit PS-26 by the Atomergic Chemicals Corporation). The mixture was stirred and centrifuged several times to achieve a homogeneous and gas-free solution which was then sandwiched between two conducting glass plates ten minutes after mixing the various components. The resulting 26 μm film was placed in a 47 kGauss magnetic field in a direction containing the plane of the film (henceforth called the direction of cure) and left there for 41 hours at 15° C. After removal from the field and cooling to room temperature, the resulting solid film was observed to be opaque when viewed with a linear absorption polarizing filter whose polarization was parallel to the direction of cure. If the polarization of the filter was turned perpendicular to the direction of cure, the film appeared transparent.

The polarizing properties of the film were further measured using polarizing light from a high intensity light source at normal incidence. The ratio of the intensity of the transmitted light when the beam was polarized perpendicular to the direction of cure to the intensity of the transmitted light when the beam was polarized in a direction parallel to the direction of cure was measured to be 30. Upon application of an electric field in a direction normal to the film the material switched to a non-polarizing (transmitting) state. The response time was less than 0.3 milliseconds; the time required for the film to relax back to the polarizing state was less than 3.0 milliseconds. The intensity of the light transmitted by the film was reduced upon switching from the non-polarizing to the polarizing state. This reduction was 2 orders of magnitude in the case of incident light polarized in the direction of curing, but was only about 3 fold for incident light polarized in a direction perpendicular to the direction of curing.

EXAMPLE X

A polarizer similar to that of Example I was made except that a mixture of 67% E-20 (43.96% 4'-n-pentyl-4'-cyanobiphenyl; 40.78% 4'-n-heptyl-4'-cyanobiphenyl; 9.22% 4'-n-octyloxy-4-cyanobiphenyl; 6.05% 4'-n-pentyl-4-cyanoterphenyl; BDH Chemicals, Ltd.) and 33% 10 CB (4'-methoxy-4-cyanobiphenyl), deuterated on the methoxy position, was used instead of E-7. This film showed the same polarizing properties as in Example I. A bulk sample with the same composition was cured in an NMR (Nuclear Magnetic Resonance) glass tube under the same conditions as Example I. Deuterium nuclear magnetic resonance spectra of this sample were taken at temperatures between 10° C. and 45° C. and with the directions of cure oriented both along the static magnetic field and perpendicular to it. Deuterium spectral patterns showed that the liquid crystal molecules preferred an average orientation such that the long molecular axis was along the direction of the magnetic field during the curing process.

EXAMPLE XI

Two films were made with the same compositions as in Example IX and were cured in an electric field at 9° C. for 43 hours. During the curing process an a.c. voltage of 100 v, oscillating at a frequency of 1 KHz was applied to transparent conductors on the surfaces of one of the films. The other film was cured without the presence of an applied electric field. Following the curing process, the films were examined for their optical properties. At room temperature the film cured in the electric field was more transparent than the film cured without the elecric field. This demonstrated that the application of an a.c. electric field during the curing process locked in the orientation of the optic axes of the droplets in the cured medium.

EXAMPLE XII

A scattering polarizer was made by using E-7 as the liquid crystal and Conuthane Tu50A, parts A and B (Conap Inc., Buffalo, N.Y.), as the polyurethane. Part A is a prepolymer formed from the reaction of an excess of toluene diisocyanate and polyether glycols, and part B is a mixture of 4-4'-methylenebisisoorthochloroaniline and various polyols. Parts A and B were mixed in the ratio of 1:0.94 respectively. A mixture of 35% E-7 and 65% parts A and B was made. To this was added 26 μm Alufrit spacers as in Example IX. The sample was centrifuged to remove gas bubbles. A 26 μm film was made by sandwiching the mixture between conductive glass plates. The resulting sandwich was cured overnight at 65° C. Upon curing, droplets formed resulting in a device which was opaque and scattering at room temperature. A slight strain on the film resulted in the polarization of light passing through the film. When viewed with a linear absorption polarizing filter the device appeared opaque when the direction of polarization of the filter and the direction of the applied strain were aligned; the device appeared transparent when the directions were orthogonal. The device may be switched electrically. Approximately 26 volts must be applied across a film 26 μm thick in order to completely switch from the scattering to clear state. In both the stressed and relaxed states, the application of an electric field caused the device to respond in about 4 milliseconds. The relaxation time of the device is highly dependent on the stress. A strained device relaxed in about 5 milliseconds, whereas an unstrained device required 18 milliseconds to relax.

Many modifications and variations of the invention will be apparent to those skilled in the art in light of the foregoing detailed disclosure. Therefore, it is to be understood that, within the scope of the appended claims, the invention can be practiced otherwise than as specifically shown and described.

We claim:

1. A light modulating material comprising droplets of liquid crystal dispersed in a solid, light transmissive resin matrix, said liquid crystal being soluble in the matrix-forming composition and said droplets being spontaneously formed from solution in the composition during solidification thereof.

2. A light modulating material as claimed in claim 1 wherein said resin is an epoxy.

3. A light modulating material as claimed in claim 1 wherein said liquid crystal comprises a cyanobiphenyl.

4. A light modulating material as claimed in claim 1 wherein said resin is a polyurethane.

5. A light modulating material as claimed in claim 1 wherein said liquid crystal has an optical index of refraction in the isotropic phase which is similar to that of said resin, whereby said material transmits light, and an optical index of refraction in the liquid crystalline phase which differs from that of said resin matrix such that incident light is scattered and said material is opaque.

6. A light modulating material as claimed in claim 5 wherein said liquid crystal is a cyanobiphenyl.

7. A light modulating material as claimed in claim 1 wherein said liquid crystal is nematic having an ordinary optical index of refraction similar to the index of refraction of said resin matrix.

8. A light modulating material as claimed in claim 7 wherein said liquid crystal is a cyanobiphenyl.

9. A material capable of modulating light comprising droplets of liquid crystal dispersed in cured epoxy resin, said liquid crystal being soluble in uncured epoxy resin and said droplets being spontaneously formed during curing.

10. A material as claimed in claim 9 wherein said liquid crystal comprises a cyanobiphenyl.

11. A thermally responsive, light modulating material capable of reversibly changing between opaque and light transmissive states comprising droplets of liquid crystal dispersed in cured epoxy resin, said liquid crystal being soluble in the uncured epoxy resin and said droplets being spontaneously formed during curing, said liquid crystal having in its isotropic phase an optical index of refraction such as to permit transmission of incident light, and having in its liquid crystalline phase an optical index of refraction such that incident light is scattered and said material is opaque.

12. A material as claimed in claim 11 wherein said liquid crystal comprises a cyanobiphenyl.

13. An electrically responsive device capable of being reversibly switched between opaque and light transmissive states comprising electrode means, a synthetic resin matrix between said electrode means, droplets of nematic liquid crystal dispersed in said resin matrix, said liquid crystal being soluble in the matrix-forming composition and said droplets being spontaneously formed from solution in the composition during solidification thereof, and a voltage source connected to said electrode means for establishing an electric field across said resin matrix and liquid crystal droplets, said liquid crystal having an ordinary optical index of refraction similar to the index of refraction of the matrix so that incident light is passed through said device in the presence of an electric field, and having its other index refraction such that incident light is scattered and said device is opaque in the absence of an electric field.

14. A device as claimed in claim 13, including a pleochroic dye incorporated in said liquid crystal.

15. A device as claimed in claim 13 wherein said liquid crystal comprises a cyanobiphenyl.

16. A light polarizing material comprising droplets of liquid crystal dispersed in a matrix of solid, light-transmissive resin, said liquid crystal being soluble in the matrix-forming composition, said droplets being spontaneously formed from solution in the composition during solidification thereof, and said liquid crystal having an ordinary index of refraction in its liquid crystalline phase such that, when said polarizing material is strained in one direction, one component of plane polarized incident light will be scattered and the other component will be transmitted therethrough.

17. A material as claimed in claim 16 wherein said liquid crystalline phase is nematic.

18. A light modulating material as claimed in claim 16 wherein said liquid crystal comprises a cyano-biphenyl.

19. An electrically responsive, light modulating device comprising spaced, transparent electrode means, a sheet or film formed by a light transmissive synthetic resin matrix containing droplets of liquid crystal, said liquid crystal being soluble in the matrix-forming composition and said droplets being spontaneously formed from solution in the composition during solidification thereof, and a voltage source connected to said electrode means for establishing an electric field across said sheet or film, said sheet or film being stretched so that light is transmitted through said device and is polarized when said electric field is off, and said liquid crystal having an ordinary optical index of refraction similar to the index of refraction of said sheet or film, whereby unpolarized light is transmitted through said device when the electric field is on.

20. A device as claimed in claim 19 wherein said liquid crystal is a cyanobiphenyl.

21. A device as claimed in claim 20 wherein said matrix is an epoxy resin.

22. A resin matrix containing droplets of nematic liquid crystal, said liquid crystal being soluble in the matrix-forming composition and said droplets being spontaneously formed from solution in the composition during solidification thereof, said liquid crystal having an ordinary optical index of refraction similar to the index of refraction of said matrix so that at least one component of incident light is transmitted when the liquid crystal directors are aligned and so that incident light is scattered when the liquid crystal directors are misaligned.

23. An electrically addressable light modulating device capable of being reversibly switched between a polarizing mode and a non-polarizing light transmitting mode comprising:
   a light transmissive synthetic resin matrix containing dispersed microdroplets of nematic liquid crystal having an ordinary index of refraction similar to the refractive index of said matrix,
   said microdroplets having their optical axes aligned in one direction in the plane of said matrix in said polarizing mode and normal to the plane of said matrix in said non-polarizing, light transmitting mode, and
   means to deliver a field effective to switch said device from one of said modes to the other.

24. A device as claimed in claim 23 wherein said optical axes are normal to the plane of said matrix and said device is in its non-polarizing, light transmitting mode when the field is on, and is in its other mode when the field is off.

25. A device as claimed in claim 23 wherein said optical axes are aligned in one direction in the plane of said matrix and said device is in its polarizing mode when the field is on, and is in its other mode when the field is off.

26. The device as claimed in claim 23, 24 or 25 wherein said liquid crystal is a cyanobyphenyl.

27. A light modulating material comprising a solid sheet formed by a light transmitting synthetic resin matrix containing dispersed microdroplets of nematic liquid crystal having an ordinary index of refraction similar to the refractive index of said matrix, said microdroplets being arranged so that their optical axes will scatter at least one component of light incident on a surface of said sheet and being responsive to a field whereby said optical axes are aligned normal to said surfare so that incident light is transmitted through said sheet.

28. A light modulating material as claimed in claim 27 wherein said microdroplets are arranged so that said optical axes are aligned in one direction parallel to said surface in the absence of said field.

29. A light modulating material as claimed in claim 27 characterized in that in the absence of said field said optical axes are unaligned and said material is opaque.

30. A light modulating material as claimed in claim 27, 28, or 29 wherein said liquid crystal is a cyanobiphenyl.

31. A light modulating material comprising a solid sheet formed by a light transmitting synthetic resin matrix containing dispersed microdroplets of nematic liquid crystal having an ordinary index of refraction similar to the refractive index of said matrix, said microdroplets being arranged with their optical axes normal to a surface of said sheet so that incident light on said surface is transmitted through said material and being responsive to a field or to strain whereby said optical axes are caused to shift to an orientation effective to scatter at least one component of said incident light.

32. A field responsive, light modulating device comprising a light transmissive synthetic resin matrix containing dispersed microdroplets of nematic liquid crystal having an ordinary index of refraction similar to the refractive index of said matrix, said microdroplets being oriented with their optical axes aligned in one direction, and means for establishing a field effective to shift the alignment of said optical axes.

33. A field responsive, light modulating material comprising a light transmissive synthetic resin matrix containing dispersed microdroplets of nematic liquid crystal having an ordinary index of refraction similar to the refractive index of said matrix, said microdroplets being oriented so that their optical axes are aligned in one direction and being responsive to a field whereby the alignment of said optical axes is changed.

34. A method of making a light modulating material comprising the steps of dissolving liquid crystal in a solidifiable, light transmissive resin matrix-forming composition, and thereafter solidifying said composition and causing spontaneous formation of liquid crystal droplets.

35. A method as claimed in claim 34 wherein said matrix comprises clear epoxy resin.

36. A method as claimed in claim 34 wherein said matrix is solidified by exposure to ultra-violet light.

37. A method as claimed in claim 34 including the step of stretching the solidified matrix to orient the optical axes of said liquid crystal droplets.

38. A method as claimed in claim 34 wherein said liquid crystal comprises a cyanobiphenyl.

39. A method of making a material capable of exhibiting contrasting response from opaque to light transmissive conditions comprising the steps of stirring together liquid crystal, epoxy resin, and curing agent to form a mixture in which the liquid crystal is dissolved, and curing said mixture to form a solid which contains droplets of liquid crystal spontaneously formed upon curing.

40. A method of making a light modulating material comprising the steps of dissolving liquid crystal in a resin capable of being cured to form a clear matrix, said liquid crystal having the characteristic of spontaneously forming droplets upon curing of said resin, and thereafter curing said resin to form a matrix containing a uniform dispersion of liquid crystal droplets, said liquid crystal being further characterized by an ordinary optical index of refraction similar to that of the cured resin so that at least one component of incident light will be transmitted when the liquid crystal directors are aligned and so that incident light will be scattered when the liquid crystal directors are misaligned.

41. A method as claimed in claim 40 wherein said liquid crystal droplets comprise a cyanobiphenyl.

42. A method as claimed in claim 40 including the step of straining the matrix to orient the optical axes of said droplets.

43. A method of making a liquid crystal microdroplet containing, light modulating material comprising the steps of:
dissolving liquid crystal in a light transmissive synthetic resin matrix-forming composition,
establishing a field effective to align the optical axes of the microdroplets, and
solidfying said composition in the presence of said field whereby the dispersed microdroplets that form spontaneously during solidification have their optical axes aligned by said field.

44. The method of claim 43 wherein said liquid crystal is a cyanobiphenyl.

45. The method of claim 43 or claim 44 wherein said liquid crystal has an ordinary index of refraction similar to the refractive index of the solidified matrix.

46. The subject matter of claims 1, 9, 11, 16, 19, 34, 39, 40, or 43 wherein said liquid crystal comprises a nematic liquid crystal.

47. The subject matter of claim 1, 9, 11, 13, 16, 19, 22, 23, 27, 31, 32, 33, 34, 39, 40 or 43 wherein said liquid crystal exhibits positive dielectric anisotropy.

* * * * *

UNITED STATES PATENT AND TRADEMARK OFFICE
CERTIFICATE OF CORRECTION

PATENT NO. : 4,688,900
DATED : August 25, 1987
INVENTOR(S) : Joseph W. Doane, et al.

It is certified that error appears in the above-identified patent and that said Letters Patent is hereby corrected as shown below:

Cover Page, Inventor Section, "Chidishimo" should be
-- Chidichimo --.

Column 8, line 5, "no" should be -- $n_o$ --.

Column 9, line 12, "ne" should be -- $n_e$ --.

Column 12, line 11, "homageneous" should be -- homogeneous--.

Column 13, line 33, insert a parenthesis ")" after
-- (Part A --.

Column 14, line 2, "Corpcration" should be -- Corporation --.

Signed and Sealed this

Tenth Day of January, 1989

*Attest:*

DONALD J. QUIGG

*Attesting Officer*   *Commissioner of Patents and Trademarks*

UNITED STATES PATENT AND TRADEMARK OFFICE
CERTIFICATE OF CORRECTION

PATENT NO : 4,688,900

DATED : August 25, 1987

INVENTOR(S) : DOANE et al.

It is certified that error appears in the above-identified patent and that said Letters Patent is hereby corrected as shown below:

Insert the following paragraph at column 1, line 5:

---The United States government has a paid-up license in this invention and may have the right in limited circumstances to require the patent owner to license others on reasonable terms as provided for by the terms of Grant DMR82-44468, awarded by the National Science Foundation.---

Signed and Sealed this

Fifth Day of January, 1999

*Attest:*

*Attesting Officer*     *Acting Commissioner of Patents and Trademarks*